(12) United States Patent
Englbrecht

(10) Patent No.: US 8,595,318 B2
(45) Date of Patent: Nov. 26, 2013

(54) PORTABLE DATA CARRIER COMPRISING A WEB SERVER

(75) Inventor: Erich Englbrecht, München (DE)

(73) Assignee: Giesecke & Devrient GmbH, Munich (DE)

( * ) Notice: Subject to any disclaimer, the term of this patent is extended or adjusted under 35 U.S.C. 154(b) by 438 days.

(21) Appl. No.: 12/743,893

(22) PCT Filed: Nov. 18, 2008

(86) PCT No.: PCT/EP2008/009740
§ 371 (c)(1),
(2), (4) Date: May 20, 2010

(87) PCT Pub. No.: WO2009/065553
PCT Pub. Date: May 28, 2009

(65) Prior Publication Data
US 2010/0250838 A1    Sep. 30, 2010

(30) Foreign Application Priority Data

Nov. 21, 2007 (DE) .......................... 10 2007 055 653

(51) Int. Cl.
*G06F 15/16* (2006.01)
(52) U.S. Cl.
USPC ........... 709/217; 709/202; 709/203; 709/218; 709/223
(58) Field of Classification Search
USPC .......................... 709/202, 203, 217, 218, 223
See application file for complete search history.

(56) References Cited

U.S. PATENT DOCUMENTS

| 6,085,239 | A * | 7/2000 | Kubo et al. ................... 709/223 |
| 6,573,942 | B1 * | 6/2003 | Crinon .......................... 348/518 |
| 6,754,443 | B2 * | 6/2004 | Nelson et al. ................. 386/241 |

(Continued)

FOREIGN PATENT DOCUMENTS

| DE | 10258769 A1 | 6/2004 |
| DE | 10261916 A1 | 7/2004 |

(Continued)

OTHER PUBLICATIONS

German Search Report in DE 10 2007 055 653.7, Apr. 25, 2008.

(Continued)

*Primary Examiner* — Liangche A Wang
(74) *Attorney, Agent, or Firm* — Workman Nydegger

(57) ABSTRACT

In a method for providing data for a data processing device (100) by a web server (72) of a data carrier (10), the web server (72) of the data carrier (10) receives (1010) a data request message from the data processing device (100) connected with the data carrier (10), the data request message relating to a provision of data for the data processing device (100). Then the web server (72) responds (1030; 1260) to the data request message by sending a data provision message which comprises the requested data. For this purpose, the web server (72) either reads out the data from a non-volatile memory (62) of the data carrier or obtains these, if the data are not stored in the non-volatile memory (62), from a data provision device (200) connected with the data carrier (10). If the requested data are obtained from the data provision device (200), the data carrier (10) determines whether the obtained data are stored in the non-volatile memory (62) of the data carrier (10) for the response to future data request messages.

21 Claims, 2 Drawing Sheets

(56) References Cited

U.S. PATENT DOCUMENTS

| | | | |
|---|---|---|---|
| 7,127,502 B1* | 10/2006 | Nishikado et al. | 709/219 |
| 7,242,962 B2 | 7/2007 | Joffray et al. | |
| 2001/0054087 A1 | 12/2001 | Flom et al. | |
| 2003/0131076 A1* | 7/2003 | Nelson et al. | 709/219 |
| 2004/0236777 A1* | 11/2004 | Pardikar et al. | 707/100 |
| 2005/0060497 A1 | 3/2005 | Krissell et al. | |
| 2005/0289291 A1 | 12/2005 | Takahashi | |
| 2007/0136238 A1* | 6/2007 | Bildhaeuser et al. | 707/2 |
| 2009/0043922 A1* | 2/2009 | Crowther | 710/33 |
| 2009/0132714 A1* | 5/2009 | Blander et al. | 709/227 |
| 2009/0193154 A1 | 7/2009 | Gotze et al. | |
| 2010/0042760 A1* | 2/2010 | Spitz et al. | 710/36 |

FOREIGN PATENT DOCUMENTS

| | | |
|---|---|---|
| DE | 10317147 A1 | 10/2004 |
| DE | 102005024122 A1 | 11/2006 |
| DE | 102005061662 A1 | 6/2007 |
| EP | 1400900 A2 | 3/2004 |
| EP | 1496480 A1 | 1/2005 |
| EP | 1628223 A2 | 2/2006 |
| WO | 0065800 | 11/2000 |
| WO | 03094474 A1 | 11/2003 |
| WO | 2004090725 A2 | 10/2004 |

OTHER PUBLICATIONS

International Search Report in PCT/EP2008/009740, Oct. 1, 2009.

* cited by examiner

PORTABLE DATA CARRIER COMPRISING A WEB SERVER

FIELD OF THE INVENTION

The present invention relates to a method in a portable data carrier having a web server for the data communication between the data carrier and a data processing device connected with the data carrier as well as such a data carrier.

BACKGROUND

In a method of the above-mentioned kind the web server provides data to the data processing device, which the latter has requested before, by the web server either reading out the requested data from a memory of the data carrier or, if the data are not stored in the memory, obtaining them from a data provision device, e.g. from a server computer in the Internet. The data processing device here for example can be a personal computer (PC), for which the data carrier acts as a so-called proxy. That means, vis-à-vis an application on the PC, e.g. vis-à-vis a web browser installed on the PC, the data carrier appears as a data supplier—i.e. as a data server—, but vis-à-vis an Internet server computer as a data recipient—i.e. as a data client. A data carrier used in such a way normally comprises an Internet protocol stack and can serve a user for example as an authentication gateway, e.g. for online banking applications or the like.

Portable data carriers, e.g. chip cards, have very limited resources regarding storage capacity. This concerns both volatile buffer memory or main memory and non-volatile memory, for example in the form of flash memories or the like. Due to the limited buffer memory, a data communication between the data carrier and an Internet server computer, for the purpose of obtaining data which are not available to the data carrier and are to be provided to the web browser on the PC, must be divided into relatively small data packets. When the response times of the Internet server computer are high, for example due to high data traffic in the Internet at a certain time of the day or a generally high load on the relevant Internet server computer, the requested data can thus be provided only very slowly to the web browser.

In the above-described scenario, the data carrier cannot resort to a strategy known from normal Internet usage without employment of an intermediary data carrier, according to which a web browser stores data, once they are obtained, on the hard disk of the PC, optionally in accordance with a user setting, so as to be able to read out these data directly from the hard disk for a future use without having to contact an Internet server computer for this purpose. Such an anticipatory storing is also referred to as "to cache", the corresponding memory "cache memory". But in the described scenario, the above-described portable data carrier cannot take on the same role vis-à-vis the Internet server computer as the web browser equipped with a cache memory in usual Internet usage, because the data carrier has too few resources at its disposal, in particular too few non-volatile storage capacity in order to realize the known strategy of storing data once they are obtained.

WO 00/65800 A1 describes a system which comprises a portable device, for example a handheld or a mobile radio terminal, having a web browser which contactlessly exchanges data with a server. The web browser stores all data, once they are obtained from the server, for a possible future use. When the memory space provided therefor is exhausted, stored data are deleted according to known strategies, e.g. the FIFO strategy ("first-in-first-out"). A passing on of the data obtained from the server by the portable device to a further data processing device is not disclosed in WO 00/65800 A1.

In WO 03/094474 A1 there is described a method for operating a mobile radio terminal. Therein, an application of the mobile radio terminal, e.g. a web browser, checks whether data received from a server of the mobile network operator comprise a store instruction, and then it stores only such data for a future use which comprise such a store instruction. In this way the mobile network operator can determine which data are stored on the mobile radio terminal. WO 03/094474, too, describes no passing on of the data obtained from the server to a third instance.

DE 103 17 147 A1 discloses a chip card with a flash memory and a cache memory in the form of a non-volatile RAM memory. With the help of a control unit there is created, by means of the flash memory and of the non-volatile cache memory, a memory system with non-volatile memory that can be updated very quickly word by word. A use of the chip card for the purpose of data communication between various units, e.g. between a PC and an Internet server, is not disclosed in DE 103 17 147 A1.

SUMMARY

It is the object of the present invention to propose a method which enables the portable data carrier to provide requested data to a data processing device as efficient as possible.

The method according to the invention is based on the idea that the data carrier decides itself whether data requested by a data processing device from the data carrier and obtained from a data provision device are stored in the data carrier in a non-volatile fashion.

A web server of the data carrier receives a data request message from a data processing device connected with the data carrier, the data request message relating to a provision of data for the data processing device. Then the web server responds to the data request message by sending a data provision message which comprises the requested data. For this purpose, the web server reads out the data either from a non-volatile memory of the data carrier or obtains the data, if they are not stored in the non-volatile memory, from a data provision device connected with the data carrier. The method according to the invention is characterized in that, if the requested data have to be obtained from the data provision device, the data carrier determines whether the obtained data are stored in the non-volatile memory of the data carrier for responding to future data request messages.

A correspondingly adapted portable data carrier according to the invention thus comprises at least one communication interface, a non-volatile memory, and a web server application. The web server application is adapted to receive a data request message from a data processing device connectable with the data carrier via the at least one communication interface, the data request message relating to data to be provided for the data processing device. The web server application is further adapted to response to the data request message by sending a data provision message which comprises the requested data. For this purpose, the web server application either reads out the data from a non-volatile memory of the data carrier or it sends, if the data are not stored in the non-volatile memory, a data obtaining message to a data provision device connectable with the data carrier via the at least one communication interface, which relates to an obtaining of the data from the data provision device, and finally receives the data to be obtained from the data provision device in the form of a data message. According to the invention, the portable data carrier further comprises a check application which is adapted, if the data are not stored in the non-volatile memory of the data carrier and thus have to be obtained from the data provision device, to determine whether the obtained data are stored in the non-volatile memory of the data carrier.

By the data carrier permanently storing certain data obtained from the data provision device in a non-volatile memory of the data carrier, it can provide these data, when they are requested again by the data processing device in the future, directly to said data processing device without having to establish a new data communication with the data provision device. In this way, data traffic is avoided and the requested data are quickly available to the data processing device. Since the data carrier autonomously decides whether and which data obtained from the data provision device are stored in the non-volatile memory, the data carrier can flexibly react to its own, predetermined, or variable resources and to external circumstances and individually effectively carry out the data provision for the data processing device. The total load on the relevant data network is reduced, while the requested data can be provided quicker to the data processing device. At the same time the limited resources of the data carrier are taken into account.

Preferably, the check application is adapted to determine on the basis of one or more storage criteria whether data obtained from the data provision device are stored in the non-volatile memory of the data carrier for the response to future data request messages. Such storage criteria may be stored in corresponding files in a memory of the data carrier, which the check application can access.

A first storage criterion, on the basis of which the data carrier determines whether the data are stored in the non-volatile memory, stipulates at least one data type for data obtained from the data provision device to be stored. In this case the check application determines that those data obtained from the data provision device which correspond to the data type predetermined in the storage criterion are stored in the non-volatile memory of the data carrier for responding to future data request messages. Preferably, the predetermined data type is a graphic data type, a video data type, an audio data type or the like, but other data types are also possible. In case of Internet pages, data of a graphic data type often serve as background image data which even remain unchanged when textual contents are changed on the corresponding page. When such data are stored in the non-volatile memory of the data carrier, the data amount which has to be obtained by the data processing device from the data provision device upon a future enquiry as to the same Internet page is reduced, and this normally significantly, since the background image data do not have to be obtained again.

A second storage criterion stipulates a frequency with which the data enquiry messages regarding the data to be obtained are received. The data carrier thus determines on the basis of this storage criterion e.g. that data which are multiply requested by the data processing device are stored in the non-volatile memory of the data carrier after a repeated obtaining from the data provision device. For this purpose, in the data carrier can be stored in a non-volatile fashion e.g. a list which contains one entry per request for data requested by the data processing device so far. By the storage of multiply requested data, requests of the data processing device recurring several times, which relate to the same data and thus are especially relevant, can be effectively responded by the data carrier without having to establish a data communication connection with the data provision device.

The data carrier can further determine on the basis of a third storage criterion which relates to a data volume of the data obtained from the data provision device, whether the data are stored in the non-volatile memory of the data carrier. Preferably, the data carrier determines that the data are stored in the non-volatile memory, when the data volume of the data obtained from the data provision device is below a minimum data volume stipulated by the storage criterion, or the data carrier determines that the data are stored in the non-volatile memory, when the data volume of the data obtained from the data provision device exceeds a maximum data volume stipulated by the storage criterion. In this way, it can be provided e.g. that small files whose volume is below the predetermined minimum data volume in each case are stored in the non-volatile data carrier after the obtaining from the data provision device, or that very large files whose volume is above the predetermined maximum data volume are stored in the memory. By storing numerous small files, the data carrier avoids that a data communication connection to the data provision device has to be established in each case for an only very small data amount to be obtained. The storage of large files is particularly advantageous, when a response time of the data provision device is high at that moment, because for obtaining large data amounts between the data carrier and the data provision device, due to the limited buffer memory of the data carrier, there have to be transmitted many data packets and the whole data transfer would last an accordingly long time.

A fourth storage criterion relates to a time period which is needed for obtaining the data from the data provision device. Such a time period in particular can be the above-mentioned response time of the data provision device, which passes between a data carrier's enquiry at the data provision device and a data provision device's response to the enquiry of the data carrier. The check application of the data carrier thus can e.g. autonomously decide to store data obtained from the data provision device when the response time of the data provision device exceeds a given time period. In this way it is possible that in the case of a very high workload on the data provision device or on a transferring data network, in the case of which the corresponding response times of the data provision device are accordingly high, data that have been stored once do not have to be obtained again.

It can further be provided, that a fifth storage criterion stipulates predefined data as data to be stored. This is expedient in particular when it is already known, which data will be often requested by the data processing device from the web server of the data carrier in the future. These data can then be defined, according to the above-described storage criterion, as data to be stored, whereupon the data carrier determines that these data are stored in the non-volatile memory upon a first request of the data at the data provision device. For example, the image background data of a homepage of a bank's Internet presence can be defined as data to be stored in the non-volatile memory, when it is known before the issue of the data carrier to a user that the user will carry out online banking transactions on the corresponding page of the bank via the data carrier.

A sixths storage criterion can finally also relate to the size of a buffer memory of the data carrier. The data carrier for example can store data obtained at the data provision device in the non-volatile memory of the data carrier, whenever the available buffer memory falls below a given minimum size.

The above-mentioned various storage criteria can be used singly or in combination. The check application can thus form several of the mentioned storage criteria into propositional-logic conditions and use as complex storage criteria.

The check application is preferably adapted, if data obtained from the data provision device are not stored in the non-volatile memory of the data carrier, to determine on the basis of a remote storage criterion whether the data to be provided to the data processing device with the data provision message are to be stored by the data processing device. If the check application determines that these data are to be stored by the data processing device, a control application of the data carrier can provide the corresponding data with a storage note or with a storage instruction to the data processing device. In this way, it is e.g. possible to relieve the data carrier, by the data processing device storing data, which it accesses several times again and again, in itself without having to request these again and again from the data carrier. The data carrier thus has to process less data request messages of the data processing device and to obtain less data from the data provision device or to store less data in the non-volatile memory of the data carrier.

The control application of the data carrier is further adapted to store data obtained from the data provision device and determined by the check application to be stored in the non-volatile memory together with a storage time information which relates to the time of the data's storage in the non-volatile memory of the data carrier. In this way, the check application can easily check the data stored in the non-volatile memory of the data carrier as to how current they are and in case the data processing device again requests the corresponding data decide whether the data have to be again obtained from the data provision device or whether the data stored in the non-volatile memory together with the storage time information can be provided to the data processing device.

The control application of the data carrier can further be adapted such that data obtained from the data provision device which are determined by the data carrier to be stored in the non-volatile memory are obtained from the data provision device, upon the first obtaining of the data, in the form of a sequence of data packets of a first predetermined size which does not exceed the size of a buffer memory of the data carrier, and only a part of the obtained data packets is stored in the non-volatile memory. Upon a further obtaining of the already obtained data, the data are then obtained from the data provision device in the form of a sequence of data packets of a second predetermined size which exceeds the first predetermined size. Preferably, the control application stipulates the first predetermined size substantially as the size of the buffer memory of the data carrier and stores only every second of the obtained data packets in the non-volatile memory. Expediently, the second predetermined size is determined by the control application substantially as double the first predetermined size. In this way, on the one hand the resources of the data carrier, in particular the available non-volatile memory, are spared since only half of the data packets are stored in the non-volatile memory upon the first obtaining. On the other hand, the repeated obtaining of the data from the data provision device is accelerated by the fact that due to the double size of the data packets only half the number of data packets has to be transferred between the data provision device and the data carrier. The data carrier is only capable of storing half of such a data packet in its buffer memory in each case. But this is compensated in that upon the first obtaining of the data, that half of the data packet that now will be lost upon the further obtaining has already been stored in the non-volatile memory as a data packet of half the size.

The check application and the control application are preferably adapted such that a body issuing the data carrier can configure the respective applications for a later intended use of the data carrier, e.g. via a configuration menu which can be called up on the data carrier. For this purpose, in particular, it can be provided that the respective applications can be subsequently changed or supplemented by the issuing body, e.g. by more precisely specifying existing storage criteria or by loading further storage criteria later.

Preferably, the data carrier according to the invention comprises as a non-volatile memory a non-volatile cache memory in the form of a flash memory or of a non-volatile RAM memory for the storage of the data obtained from the data provision device and determined by the check application to be stored. In this way, the stored data can always be quickly accessed.

BRIEF DESCRIPTION OF THE DRAWINGS

In the following the present invention is described by way of example with reference to the accompanying Figures.

DETAILED DESCRIPTION OF VARIOUS EMBODIMENTS

Figure 1:
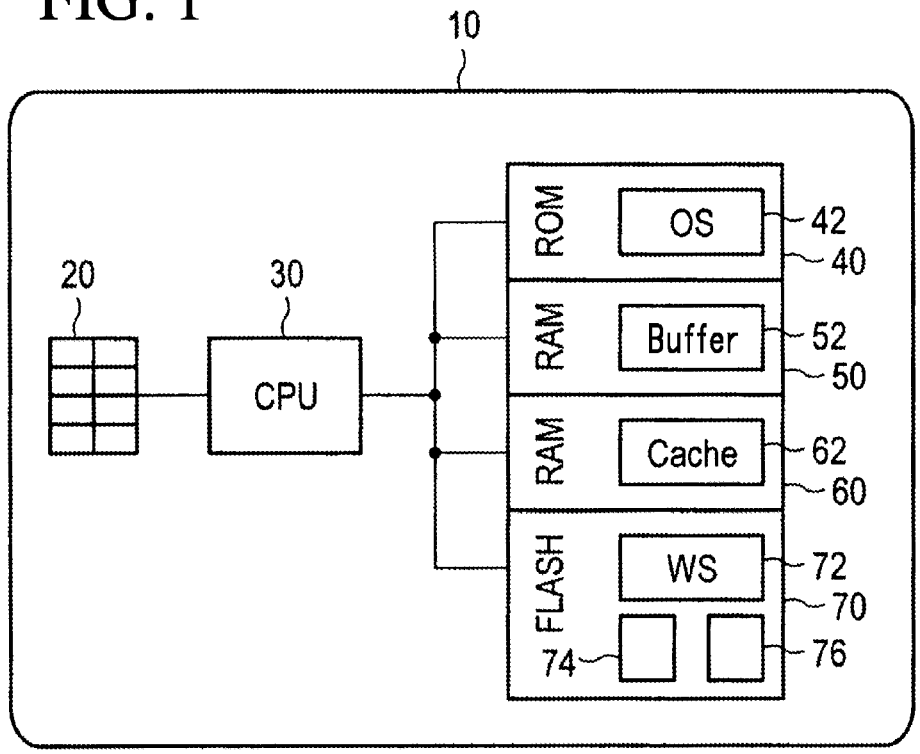
FIG. 1 shows a preferred embodiment of a data carrier according to the invention.

With reference to FIG. 1, a portable data carrier 10, which here is represented as a chip card, comprises a communication interface 20, a processor (CPU) 30, and a number of different storage components 40, 50, 60 and 70. Via the communication interface 20, which in the embodiment of FIG. 1 is formed as a contact surface according to ISO 7816, the data carrier 10 can exchange data with various communication partners with which it may be connected, for example via a card reading device (not shown). Other communication interfaces are possible, for example according to the USB or SD standard. It is possible that the data carrier 10 is formed as a so-called dual interface data carrier and additionally to the contact-type communication interface 20 comprises a contactless communication interface (not shown), e.g. in the form of an antenna coil, or even communicates exclusively contactlessly. The data carrier for example can also be formed as a mass memory, as a USB token or the like.

The data carrier 10 comprises a non-volatile, non-rewritable ROM memory 40, in which is stored an operating system (OS) 42 for controlling the data carrier 10. The operating system 42 may comprise a TCP/IP protocol stack, so that the data carrier 10 is able to send data via the Internet and to receive data transferred thereby. But the TCP/IP protocol stack or the operating system 42 or at least parts thereof may also be stored in the non-volatile, rewritable flash memory 70.

Figure 3:
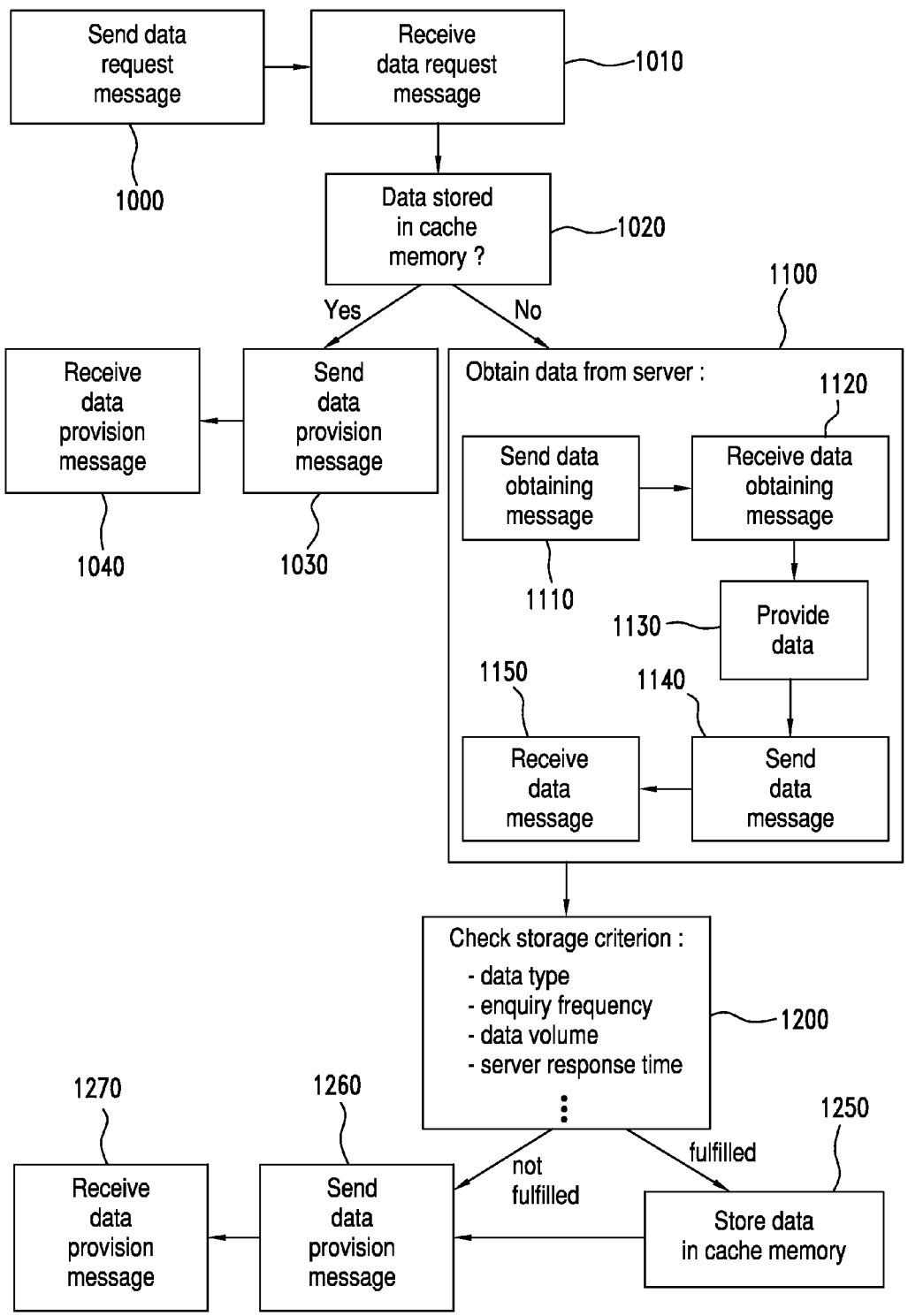
FIG. 3 shows steps of a preferred embodiment of the method according to the invention.

In the flash memory 70 are stored various applications which are executable on the processor 30, e.g. a web server application (WS) 72, a check application 74, and a control application 76. These applications are described in the following in more detail with reference to FIG. 3. Data generated or needed by the applications may also be stored in the memory 70. The flash memory 70 may also be formed as an EEPROM memory or the like.

The data carrier 10 further comprises a volatile RAM memory 50 which comprises a buffer memory area 52 which for example is employed for gathering data received via the communication interface 20 upon a data communication, before these are further processed in the data carrier 10. The RAM memory 50 in general serves as a quick main memory for the data carrier 10.

Additionally to the volatile RAM memory 50, the data carrier 10 comprises a non-volatile, rewritable RAM memory 60, for example in the form of a FeRAM (Ferroelectric Random Access Memory). The memory 60 comprises a cache area 62, which serves to temporarily store data, so that the data carrier 10 can quickly access these data without having to obtain them from a data provision device, e.g. a server in the Internet, via a data communication connection to be established via the communication interface 20. When the web server application 72 for example receives a data request message of a data processing device connected with the data carrier 10, which requests data that are already stored in the cache memory 62, the web server application 72 can directly respond to this request by reading out the respective data from the cache memory 62 and sending them as a part of a data provision message to the data processing device. But it is also possible to do without the non-volatile RAM memory 60 and to form a corresponding cache memory 62 as a part of the flash memory 70.

Figure 2:
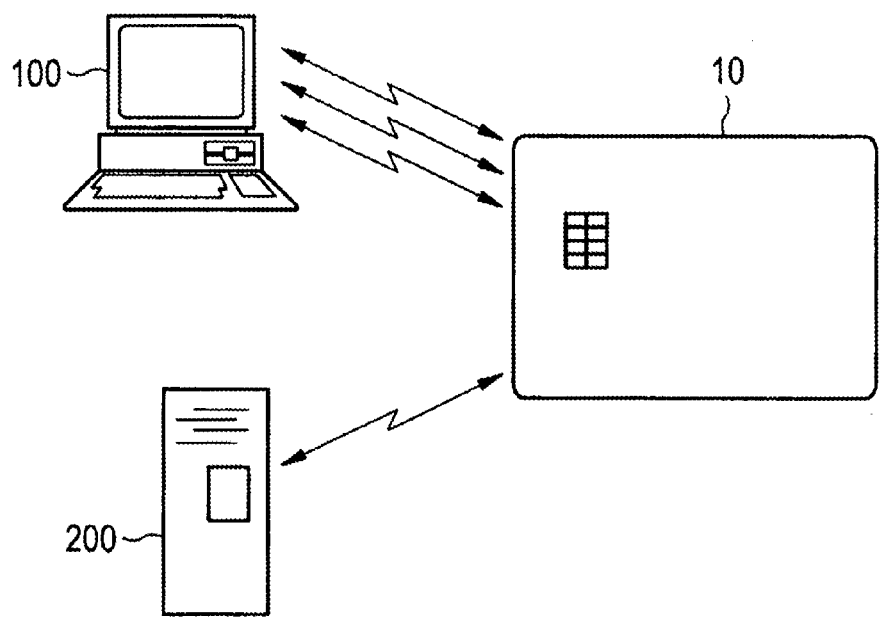
FIG. 2 shows components involved in a method according to the invention.

In FIG. 2 there are schematically represented the above-mentioned communication partners of the data carrier 10—the data processing device in the form of a personal computer (PC) 100 and the data provision device in the form of an Internet server 200. A data communication with the data carrier 10 may also take place between other devices and via other communication networks, e.g. with a mobile radio terminal in the role of the data processing device and a server of a mobile phone service provider as a data provision device. Then a part of the data communication runs contactlessly via a respective mobile phone network.

As represented in FIG. 2, the data carrier 10 may be connected as a proxy between the PC 100 and the server 200 and respond to data requests of the PC 100 either directly or obtain the requested data from the server 200 and then pass them on to the PC 100. A preferred embodiment of a method for carrying out such a data communication is described in detail in the following with reference to FIG. 3.

In step 1000 an application executed on the PC 100, such as e.g. a web browser application, sends a data request message to the data carrier 10 connected with the PC 100, for example in the form of a HTTP enquiry, with which the web browser requests data from the data carrier 10. The web server application 72 of the data carrier 10 receives the data request message in step 1010 via the communication interface 20 and checks in step 1020 whether the requested data are stored in the cache memory 62 of the data carrier 10.

If this is the case, the web server application 72 responds to the data request message of the web browser in step 1030 by reading out the data from the cache memory 62 and sending a data provision message, which comprises the requested data, to the web browser, for example in the form of an appropriate HTTP response.

If, however, the requested data are not stored in the cache memory 62 of the data carrier 10, the web server application 72 obtains these data in step 1100 from the Internet server 200. For this purpose, the web server application 72 sends in step 1110 a data obtaining message to the server 200, which is received from the latter in step 1120. The server 200 then provides the requested data in step 1130 and sends a data message, which comprises the requested data, in step 1140 to the web server application 72 of the data carrier 10, which receives this data message in step 1150.

In step 1200 the above-mentioned check application 74 of the data carrier 10 checks whether one or more predetermined storage criteria are fulfilled and then determines whether the data are stored in the cache memory 62 by the above-mentioned control application 76. Data once stored in the cache memory 62 can be quickly and easily provided to the web browser of the PC 100 upon future request, as described above with reference to the steps 1020 to 1040.

The storage criteria here may relate to the requested data, as well as to parameters relating to the current data communication with the server 200, as well as to parameters of the data carrier 10, and general presettings that are stored in the data carrier 10. It is possible that the check application 74 determines that the data are stored, when one storage criterion is fulfilled. But it can also determine that the data are not stored until a combination of more storage criteria is fulfilled. Here, the check application 74 may use different combinations of storage criteria for different requested data. The combinations for identical, multiply requested data may also vary depending on other accompanying circumstances.

A number of possible storage criteria, which in the described method are implemented in the data carrier 10, is described in the following by way of example. One storage criterion states that data requested by the web browser, which are of a corresponding data type, are to be stored in the cache memory 62. This may relate for example to a graphic, video, or audio data type. Whenever the requested data are of such a data type, which in a data communication according to the HTTP protocol can be read e.g. from the header entry "content type", the check application 74 determines that the corresponding data are stored in the cache memory 62.

A further storage criterion states that those data are to be stored in the cache memory 62 which are requested several times by a data processing device, e.g. the web browser of the PC 100. The required frequency defined in the storage criterion can vary here. For this purpose, the web server application 72 may manage a simple list of entries about data requested so far, the check application 74 then testing whether the requested data are represented in the list in a frequency defined by the storage criterion. It is possible here that an entry in the list, which is preferably stored in a non-volatile manner, comes from a session of the data carrier 10 with a device differing from the PC 100. If the data have already been requested in the required frequency, the check application 74 determines that the data are stored in the cache memory 62. The entries about the requested data can then be deleted from the list of the web server application 72.

According to a further storage criterion the check application 74 determines that requested data are stored, when their data volume is below a certain predetermined minimum data volume or exceeds a predetermined maximum data volume. The check application 74 thus determines for example that small files obtained from the server 200 are stored, so that the web server application 72 in case of a repeated enquiry of the web browser about such a file does not have to establish a new data communication connection to the server 200. On the other hand, the check application 74 determines that very large files obtained from the server 200 are stored in the cache memory 62 of the data carrier 10.

A further storage criterion relates to a time period between the sending of a data obtaining message by the data carrier 10 to the server 200 and the receiving of a data message from the server 200 in response to the data obtaining message. If this time period, the so-called server response time, exceeds a time period defined in the storage criterion, the check application 74 determines that the requested data are stored in the cache memory 62 of the data carrier 10.

Another storage criterion stipulates data which are stored in the cache memory 62 of the data carrier 10 as soon as they have been obtained from the server 200 for the first time. This normally relates to those data from which it is known in advance that they are repeatedly requested by the web browser of the PC 100.

According to a further storage criterion, the check application 74 may condition the decision, whether requested data are stored, on the size of the currently available buffer memory 52 of the data carrier 10 and thus react to the current resources situation of the data carrier 10. Another storage criterion may relate to the memory space still available in the cache memory 62.

Other storage criteria may be used on the basis of which the check application 74 determines, whether requested data, when they have not already been stored in the cache memory 62, are stored there.

If the check application 74 has determined that the obtained data are not stored in the cache memory 62, it can determine, before the data are sent in step 1260 as a part of a data provision message to the web browser of the PC 100 in response to the data request message received in step 1010, on the basis of one or more remote storage criteria, whether the data are provided with a storage note or a storage instruction which determine that the data are to be stored by the web browser on the hard disk of the PC 100. The remote storage criteria may partly correspond with the above-mentioned storage criteria or, however, may be different.

Depending on what the check application 74 has determined, the web server application 72 sends the data provision message, which comprises the requested data, with or without storage instruction in step 1260 to the web browser of the PC 100.

If the check application 74 determines that requested data are to be stored in the cache memory 62, while there is not enough memory space available for the data to be stored, then the control application 76 decides in accordance with known strategies which data stored in the cache memory 62 are removed. According to the FIFO strategy e.g. always those data are deleted which have been stored the longest in the cache memory 62. Another strategy, LRU (least recently used), stipulates deleting those data which have been least recently requested. Other strategies are possible.

If the check application 74 has determined data to be stored in the cache memory 62, it prompts the control application 76 in step 1250 to store the data in the cache memory 62. The control application 76 then stores the data together with an information about storage time in the form of a time stamp which indicates when the data were stored. This helps to judge how current the data are and simplifies strategies for deleting data from the cache memory 62. But one can also do without the time stamp.

Then the web server application 72 sends the data provision message, which comprises the requested data, in step 1260 to the web browser of the PC 100.

The obtaining of data from the server 200 described with reference to step 1100 is normally effected by obtaining a plurality of data packets which besides a protocol-dependent header portion each have a data portion of a given predefined size. The size of this data portion can be agreed between the data carrier 10 and the server 200 at the beginning of the respective data transfer. Due to the limited resources of the data carrier 10, in particular the limited size of the available buffer memory 52, data of a larger volume can be received by the data carrier 10 only in the form of a plurality of data packets, each of which has a size that does not exceed the size of the buffer memory 52. The smaller the data packets, thus, the more of them have to be transferred, and the longer the data transfer lasts.

If now the check application 74 determines that data obtained from the server are to be stored in the cache memory 62, the procedure can be as follows. Upon the first obtaining of the data, the control application 76 stipulates a size of the data packets to be received—to be more precise, actually the size of the data portion of the data packets; the header portion in most cases has a negligible constant size—which substantially corresponds to the size of the buffer memory 52, and upon receiving the data packets stores in each case only every second received data packet in the cache memory 62. Upon a repeated obtaining of the same data, which becomes necessary when the data are requested again by the web browser of the PC 100, the control application 76 determines the size of the data packets to be obtained at double the size, i.e. the size of the data packets now substantially corresponds to double the size of the buffer memory 52. Accordingly, only half as many data packets have to be obtained as upon the first obtaining and the respective download requires less time. The buffer memory 52 now can accept only half of each of the received data packets which is due to the size of the data packets. Since, however, the thus lost other half of the data packet has already been stored upon the first obtaining—as a data packet of half the size—in the cache memory 62, in the data carrier 10 again are available the complete requested data and can be sent to the web browser of the PC 100. In this way, a middle course can be found between a moderate consumption of cache memory resources in the data carrier 10 with at the same time relatively quick response to enquiries of the web browser.

The invention claimed is:

1. A method in a portable data carrier having a web server, comprising the steps:
   receiving a data request message from a data processing device connected with the data carrier by the web server of the data carrier, wherein the data request message relates to a provision of data for the data processing device;
   responding to the data request message by causing the web server to send a data provision message comprising the requested data to the data processing device, wherein the data are read out from a non-volatile memory of the data carrier or, if the data are not stored in the non-volatile memory, are obtained from a data provision device connected with the data carrier;
   wherein, if the requested data are obtained from the data provision device, the data carrier determines whether the obtained data are to be stored in the non-volatile memory of the data carrier,
   wherein the data carrier is a chip card or a USB token,
   wherein the data carrier determines on the basis of a storage criterion, which relates to the size of a buffer memory in a volatile memory of the data carrier, whether the data are stored in the non-volatile memory of the data carrier.

2. The method according to claim 1, wherein the data carrier determines on the basis of at least one storage criterion whether data obtained from the data provision device are stored in the non-volatile memory of the data carrier for the response to future data request messages.

3. The method according to claim 2, wherein the data carrier determines on the basis of a storage criterion, which stipulates at least one data type for data obtained from the data provision device to be stored, whether the data are stored in the non-volatile memory of the data carrier.

4. The method according to claim 3, wherein the data carrier determines on the basis of a storage criterion, which stipulates a graphic data type, a video data type, or an audio data type, whether the data are stored in the non-volatile memory of the data carrier.

5. The method according to claim 2, wherein the data carrier determines on the basis of a storage criterion, which stipulates a frequency with which data enquiry messages relating to the data to be obtained are received, whether the data are stored in the non-volatile memory of the data carrier.

6. The method according to claim 2, wherein the data carrier determines on the basis of a storage criterion, which relates to a data volume of the data obtained from the data provision device, whether the data are stored in the non-volatile memory of the data carrier.

7. The method according to claim 6, wherein the data carrier determines that the data are stored in the non-volatile memory, when the data volume of the data obtained from the data provision device is below a minimum data volume stipulated by the storage criterion, or determines that the data are stored in the non-volatile memory, when the data volume of the data obtained from the data provision device exceeds a maximum data volume stipulated by the storage criterion.

8. The method according to claim 2, wherein the data carrier determines on the basis of a storage criterion, which relates to a time period required for the obtaining of the data from the data provision device, whether the data are stored in the non-volatile memory of the data carrier.

9. The method according to claim 8, wherein the data carrier determines to store the data in the non-volatile memory of the data carrier, when a response time of the data provision device exceeds a time period stipulated by the storage criterion.

10. The method according to claim 2, wherein the data carrier determines on the basis of a storage criterion, which stipulates predefined data as data to be stored, whether the data are stored in the non-volatile memory of the data carrier.

11. The method according to claim 1, wherein data obtained from the data provision device which the data carrier determines are to be stored in the non-volatile memory, are obtained from the data provision device,
wherein upon the first obtaining, in the form of a sequence of data packets of a first predetermined size which does not exceed the size of the buffer memory of the data carrier, the data carrier stores only a part of the obtained data packets in the non-volatile memory, and
wherein upon a further obtaining of the already obtained data, the data are obtained from the data provision device in the form of a sequence of data packets of a second predetermined size which exceeds the first predetermined size.

12. The method according to claim 11, wherein the size of the buffer memory is stipulated as the first predetermined size and the data carrier stores only every second of the obtained data packets in the non-volatile memory of the data carrier, and the second predetermined size is stipulated as double the first predetermined size.

13. The method according to claim 1, wherein, if data obtained from the data provision device are not stored in the non-volatile memory of the data carrier, the data carrier determines on the basis of a remote storage criterion, whether the data sent to the data processing device with the data provision message are to be stored by the data processing device.

14. The method according to claim 13, wherein, if the data sent with the data provision message are to be stored by the data processing device, the data provision message is provided with a storage instruction.

15. The method according to claim 1, wherein the data carrier stores data obtained from the data provision device and determined to be stored in the non-volatile memory together with a storage time information in the non-volatile memory of the data carrier, which relates to the time of storage of the obtained data.

16. A portable data carrier, comprising:
at least one communication interface, a non-volatile memory, a volatile memory, and a web server application, which is arranged
to receive a data request message from a data processing device connectable with the data carrier via the at least one communication interface, wherein the data request message relates to a provision of data for the data processing device, and
to respond to the data request message by sending a data provision message comprising the requested data to the data processing device, wherein the web server application either reads out the data to be sent from a non-volatile memory of the data carrier or sends via the at least one communication interface a data obtaining message to a data provision device connectable with the data carrier and obtains the data from the data provision device, if the data are not stored in the non-volatile memory;
wherein by a check application, which is configured to determine whether the obtained data are to be stored in the non-volatile memory of the data carrier, if the data are not stored in the non-volatile memory of the data carrier,
wherein the data carrier is a chip card or a USB token,
wherein the data carrier is arranged to determine on the basis of a storage criterion, which relates to the size of a buffer memory in the volatile memory, whether the data are stored in the non-volatile memory of the data carrier.

17. The data carrier according to claim 16, wherein the check application is arranged to determine, in accordance with a method according to claim 2 on the basis of a storage criterion, whether the data are stored in the non-volatile memory of the data carrier.

18. The data carrier according to claim 16, wherein the check application is adapted to determine in accordance with a method according to claim 13, if data obtained from the data provision device are not stored in the non-volatile memory of the data carrier, whether the data to be sent to the data processing device with the data provision message are to be stored by the data processing device.

19. The data carrier according to claim 16, wherein a control application which is adapted to obtain the data to be obtained from the data provision device in accordance with a method according to claim 11.

20. The data carrier according to claim 19, wherein the control unit is arranged to store the data obtained from the data provision device according to the method of claim 15.

21. The data carrier according to claim 16, wherein the non-volatile memory is a non-volatile cache memory in the form of a flash memory or a non-volatile RAM memory.

* * * * *